US007731095B2

(12) United States Patent
Perez Lafuente et al.

(10) Patent No.: US 7,731,095 B2
(45) Date of Patent: Jun. 8, 2010

(54) TERNARY SIM CARD DELIVERY

(75) Inventors: Carlos Alberto Perez Lafuente, Madrid (ES); Eitan Mardiks, Ra'anana (IL); Francisco Javier Peres Lafuente, Madrid (ES); Alfonso Cresop Gonzalez, Madrid (ES); Luis Hernandez Furquet, Madrid (ES); Oscar Martin, Madrid (ES)

(73) Assignee: SanDisk IL Ltd, Kfar Saba (IL)

( * ) Notice: Subject to any disclaimer, the term of this patent is extended or adjusted under 35 U.S.C. 154(b) by 90 days.

(21) Appl. No.: 11/837,523

(22) Filed: Aug. 12, 2007

(65) Prior Publication Data
US 2008/0083831 A1    Apr. 10, 2008

Related U.S. Application Data

(60) Provisional application No. 60/825,720, filed on Sep. 15, 2006.

(51) Int. Cl.
*G06K 19/06* (2006.01)
(52) U.S. Cl. ........................ 235/492; 235/486
(58) Field of Classification Search ............... 235/486, 235/492
See application file for complete search history.

(56) References Cited

U.S. PATENT DOCUMENTS

| 5,975,584 | A * | 11/1999 | Vogt | 283/98 |
|---|---|---|---|---|
| 2002/0008147 | A1* | 1/2002 | Coiton et al. | 235/492 |
| 2005/0230485 | A1* | 10/2005 | Ross et al. | 235/492 |
| 2007/0108294 | A1* | 5/2007 | Rossiter | 235/492 |
| 2007/0235545 | A1* | 10/2007 | Martinez et al. | 235/486 |
| 2007/0252009 | A1* | 11/2007 | Kingsborough et al. | 235/487 |
| 2008/0015004 | A1* | 1/2008 | Gatto et al. | 463/16 |
| 2008/0019105 | A1* | 1/2008 | Amiot et al. | 361/737 |
| 2008/0083108 | A1* | 4/2008 | Perez Lafuente et al. | 29/426.5 |
| 2008/0176549 | A1* | 7/2008 | Kwan et al. | 455/419 |

FOREIGN PATENT DOCUMENTS

| DE | 19901965 A1 | 7/2000 |
|---|---|---|
| EP | 0896296 A | 2/1999 |
| FR | 2794059 A | 12/2001 |
| WO | 2005/034030 | 4/2005 |

OTHER PUBLICATIONS

Notification Concerning Transmittal of International Preliminary Report on Patentability and Written Opinion of the International Searching Authority dated Mar. 26, 2009 in PCT Application PCT/IL2007/001098.
Office Action dated Nov. 9, 2009 in U.S. Appl. No. 11/837,524.

* cited by examiner

*Primary Examiner*—Allyson N Trail
(74) *Attorney, Agent, or Firm*—Vierra Magen Marcus & DeNiro LLP

(57) ABSTRACT

A ternary card assembly is provided that includes a detachable smart card, a detachable information tab, and a disposable carrier card, which are connected by breakaway links. The smart card and the information tab may be connected to one another directly or indirectly through an intermediate element. The information tab may include one or more panels that are elastically displaceable from the plane of the information tab to render the information tab useful in different ways. A payload set is also provided, which includes a smart card and an information tab, which is detachably connected to only a part of the smart card's perimeter. Also provided are methods of preparing a smart card for use and for customizing a smart card.

39 Claims, 5 Drawing Sheets

TERNARY SIM CARD DELIVERY

RELATED APPLICATIONS

This application claims priority under 35 U.S.C. § 119(e) to U.S. Provisional Application No. 60/825,720, filed Sep. 15, 2006, which is hereby incorporated by reference in its entirety.

This application is related to U.S. patent application Ser. No. 11/837,524 of the same inventors, which is entitled "A METHOD OF PREPARING A SMART CARD FOR USE" and filed on the same day as the present application, now U.S. Publication No. 2008-0083108. U.S. patent application Ser. No. 11/837,524 also claiming priority to U.S. Provisional Application No. 60/825,720, is incorporated in its entirety as if fully set forth herein.

BACKGROUND

A smart card is a relatively small, typically pocket-sized, plastic card with an embedded integrated circuit (IC). The IC typically includes a digital storage array (memory) and a processor.

A smart card is typically used for storing data securely. In the context of mobile phone technology, secured data uniquely identifies a mobile phone subscriber to an associated Mobile Network Operator (MNO). The data stored in a smart card also defines the types of services to which a subscriber is entitled. A special kind of smart card, known as a Subscriber Identity Module (SIM) card, is a used with a cellular phone technology known as the Global System for Mobile Communications (GSM).

ISO-7810 is an international standard relating to smart cards, and the standard is managed jointly by the International Organization for Standardization (ISO) and the International Electrotechnical Commission (IEC). According to ISO-7810, smart cards may be 85.6 millimeter (mm) long and 53.98 mm wide. A smart card with the aforementioned dimensions is said to comply with the ID-1 format. Such smart card is referred to herein as an "ID-1 card." Due to their compact size, ID-1 cards can be conveniently handled during manufacturing, transferred (such as to intended end-users), and stored.

A common trend in electronics is to minimize size, and accordingly a smart card smaller than the ID-1 card has been defined. This miniature card is said to "comply with ID-000 format," which was devised as a form factor for a SIM card.

Due to the size being smaller than a card complying with the ID-1 format, SIM cards are not handled as conveniently as ID-1 cards. For example, a SIM card is more prone to becoming lost or damaged. Therefore, for handling and shipping, SIM cards are usually embedded in, integrated with, supported on, or carried by ID-1 cards (carrier cards) and detached there from at a later stage, such as when a phone subscriber wants to insert a SIM card into a mobile phone.

SIM cards are normally protected by secret information, which may be embedded as a PIN code and a PUK key. Such codes and keys are examples of information that is customized to the SIM card. Such information is herein collectively referred to as "information pertaining to the operation of the SIM card," or more generally "information pertaining to the operation of the smart card", or even just "information" for brevity. The information may include other kinds of data, such as barcode data. Sometimes, the information is printed on a piece of paper accompanying the SIM card or mounted onto the associated ID-1 carrier card. Printing the information on a piece of paper or on the SIM card's shipment envelope increases the probability of shipping SIM cards with incorrect information, due to the possibility of mismatch of the paper or envelope with the SIM card.

From a manufacturing point of view, it is relatively convenient to add by printing, engraving, and so on the information onto the surface of the ID-1 carrier card, because this step can be performed as part of the personalization or customization process of the SIM card. The part of the ID-1 card with the confidential information may be concealed with a layer of a scratch-removable material. For environmental preservation reasons, it is desirable to recycle ID-1 carrier cards after the SIM card is removed. However, ID-1 carrier cards with information thereon are usually retained by their users with their SIM cards, so they are generally not recycled.

FIG. 1 illustrates an ID-000 card 6, which is an exemplary payload, carried by an ID-1 card 2. ID-1 card 2 is thus regarded as a "carrier" card. A traditional card assembly of an ID-1 carrier card, such as ID-1 carrier card 2, and an ID-000 card, such as ID-000 card 6, may be regarded as a "2-part" card assembly. ID-000 card 6 contains an embedded integrated circuit (not shown), the external electrical contacts of which are shown at 9. Embedding an IC within ID-000 card 6 makes ID-000 card 6 a smart card, for which reason ID-000 card 6 is also referred to herein as "smart card 6."

ID-000 card 6 is shown carried by, and detachably connected to, carrier card 2 by breakaway link (or breaking line) 4, which is typically a groove, perforation, slot line, or the like. Breakaway link 4 is shown interrupted by breaking points (or breaking bridges) 8. Detaching, or separating, smart card 6 from ID-1 card 2 may be effected, for example, by first breaking points 8 and then by pulling smart card 6 from ID-1 card 2.

A breakaway link generally is a mechanically weakened line separating two elements. The breaking line may be weakened, for example by reducing its thickness to the extent that one can relatively easily separate one element from the other. In FIG. 1, breakaway link 4 (the perimeter of smart card 6) is shown between smart card 6 and carrier ID-1 card 2.

As discussed above, information pertaining to the operation of the smart card is sometimes added to the surface of the ID-1 carrier card. In FIG. 1, exemplary information "abc-1234" shown generally at 10 is displayed (exposed) on ID-1 carrier card 2 (Information 10 may have initially been covered with scratch-removable material). After detaching smart card 6 from ID-1 carrier card 2, the user still wants a record of the information, so ID-1 carrier card 2 (with information 10 thereon) is typically retained by the smart card user. Thus, at least some of the ID-1 carrier cards do not get recycled.

Therefore, it would be beneficial to have a way of adding information associated with a smart card onto its carrier card while allowing that information to be easily detached from the carrier card. The carrier card could then be recycled after the smart card and the associated information are detached there from. The present disclosure presents such a way to provide information that is more conducive to recycling waste materials. The disclosure uses the terms "PIN," "PUK," "carrier card," "payload," "information tab," and "payload set," which are understood in the present disclosure as follows:

A "PIN (Personal Identification Number) code" is a secret numeric password shared between a user and a system (usually a telecommunication system). The PIN code can be used to authenticate the user to the system.

A "PUK (PIN UnlocK) key" is a recovery code required to unlock a GSM SIM card that has been disabled or has locked itself after an incorrect PIN code was entered several consecutive times.

A "payload" is a component that may be carried by a larger object, such as a carrier card that may comply with the ID-1 format. Typically, the payload is a card smaller than the carrier card. A card that complies with the ID-000 format may be a payload.

A "carrier card" references a card that carried, carries, or is intended to carry, a payload. The carrier card essentially increases the payload's form factor. In the context of the present invention, a carrier card also carries an information tab.

An "information tab" is a descriptive element or object, which accompanies or is associated with another object. The information tab carries information, for example a PIN code and a PUK code, associated with the functionality or operation of the other object. The other object may be a SIM card or other smart card.

A "payload set" is a combination or set that includes a payload and an associated information tab.

SUMMARY

The embodiments described below are intended as exemplary and illustrative but not limiting in scope. Multiple aspects of the invention are discussed.

One embodiment of the present invention is a ternary card assembly that includes a carrier card, a smart card, and an information tab. The smart card and the information tab are detachably connected to the carrier card. The smart card may be a SIM card and may have information thereon that pertains to the functionality or operation of the smart card. The information may be unique to the smart card. At least some of the information on the information tab may be concealed, for example, by a layer of scratch-removable material. The smart card and the information tab may be directly connected, that is, they may be connected without an intermediate element. Alternatively, the smart card and the information tab may be connected through an intermediate element, which is part of the carrier card, that separates them.

The ternary card assembly may further include breakaway links for enabling the detachment of the smart card and information tab from the carrier card and, where applicable, from one another. Breakaway links may be of a type selected from the group consisting of: slot line, perforations, notches, adherent lines, breaking points, bridges, and any combination thereof. The carrier card, smart card and information tab may be made from, or include, the same raw material. The smart card and information tab may be molded as one unit.

In another embodiment of the invention, the information tab includes one or more panels that are elastically displaceable from the general plane of the information tab. Such information tab may be configured or utilized as a paper clip.

In another embodiment of the present invention, the carrier card complies with the ID-1 format, and the smart card complies with the ID-000 format.

Another aspect of the present invention is a carrier card of a card assembly with a first region, which is obtained by detaching a smart card from the carrier card, and a second region, which is obtained by detaching an information tab from the carrier card. The first region and the second region may be adjacent. The first region may be a recess or a hole, and the second region may be a hole.

Still another aspect of the present invention is a payload set including a smart card and an information tab, which is detachably connected by a breakaway link to only a part of the smart card's perimeter. The information tab may have information thereon that is unique to the smart card and pertains to the functionality or operation of the smart card. The information tab may be smaller than the smart card.

Yet another aspect of the present invention is a method of preparing a smart card for use. The method includes the steps of detaching the smart card from the carrier card and detaching the information tab from the carrier card. The detachment may be in any order, or the smart card and information tab may be detached from the carrier card concurrently.

A further aspect of the invention is a method of customizing a smart card. The method includes the steps of: providing a card assembly having a carrier card and a detachable payload set including a smart card and a detachable information tab; and uploading operational data to the smart card. The method further includes the step of adding onto the information tab information pertaining to the operational data, the information being unique to the smart card.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. It is intended that the embodiments disclosed are illustrative and not restrictive. The disclosure, however, may better be understood by reading the detailed description below with reference to the following figures, in which.

It will be appreciated that for simplicity and clarity of illustration, elements shown in the figures are not necessarily drawn to scale.

DETAILED DESCRIPTION

The invention summarized above and defined by the claims below will be better understood by referring to the present detailed description of embodiments. This description is not intended to limit the scope of claims but instead to provide examples of the invention.

Disclosed is a ternary card assembly, which includes a carrier card, which may comply with the ID-1 format, and a detachable payload set. The payload set includes a smart card as the payload, and an information tab that is associated with the smart card. Unique information pertaining to the functionality or operation of the payload may be added, for example, by printing or engraving, onto the information tab. The information tab is detachable, which encourages the recycling of carrier cards. Included below are descriptions of exemplary carrier cards, smart cards and information tabs. Described first is one embodiment of a ternary card assembly in accordance with the present invention.

Figure 2:
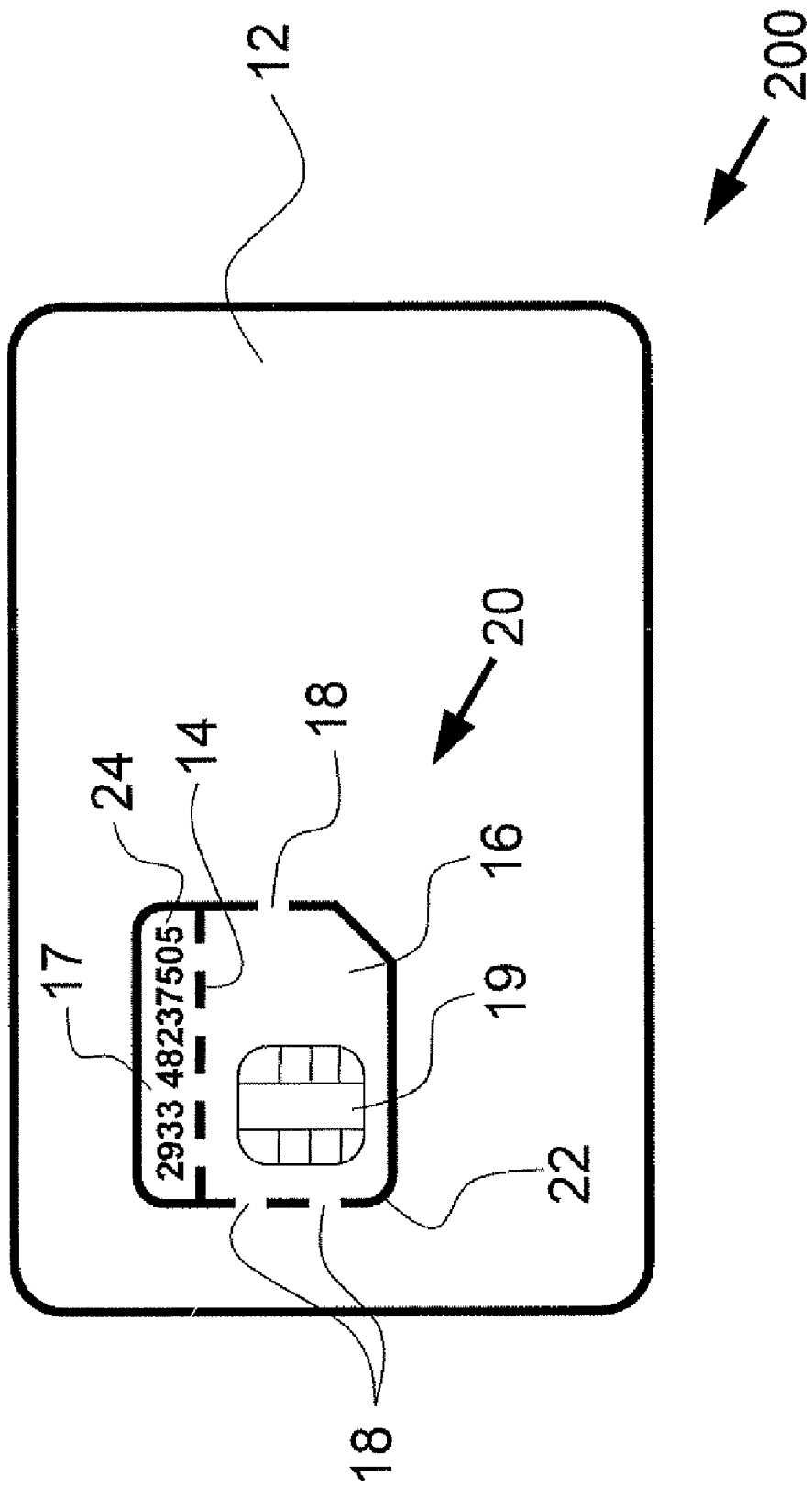
FIG. 2 depicts an exemplary ternary SIM card according to an embodiment of the present invention.

FIG. 2 depicts an embodiment in which a ternary card assembly (or "card assembly", for short) 200 includes a carrier card 12, which may comply with the ID-1 format, and a detachable payload set 20. Detachable payload set 20 includes a smart card 16, which may be a SIM card, and detachable information tab 17. Smart card 16 is shown including exemplary electrical contacts 19 of an integrated circuit, for example a SIM, embedded within smart card 16.

Breakaway link 22, which coincides with the perimeter of payload set 20, includes three exemplary breaking bridges 18 with empty spaces in between to allow detachment of payload set 20 from carrier card 12. The term "breaking bridge" denotes a breakable area with a thickness that may be equal to or less than the thickness of adjacent region. For example, a breaking bridge may be a notch. Breakaway link 22 may be obtained by mechanically weakening the zone connecting payload set 20 to carrier card 12. Breakaway link 22 may be a perforation, groove, notch, or any other like element or combination thereof. Exemplary breakaway link 22 is shown including three breaking bridges 18 bordering the perimeter of smart card 16. However, additional breaking bridges similar to breaking bridges 18 may be located around the perimeter of information tab 17.

Breaking bridges 18 secure smart card 16 in a space within carrier card 12, and a first region in carrier card 12, which corresponds to this space, may be obtained by detaching smart card 16 from carrier card 12. Information tab 17 is shown occupying another space within carrier card 12, and a second region in carrier card 12, which corresponds to this second space, may be obtained after detaching information tab 17 from carrier card 12. By way of example, the first region may be a recess or a hole in carrier card 12 that is left after detaching smart card 16 from carrier card 12, and the second region may be a hole in carrier card 12 that is left after detaching information tab 17 (either alone or with smart card 16 as a whole) from carrier card 12.

Information tab 17 is shown displaying exemplary information "2933 48237505" shown at 24, which is unique to smart card 16. The information 24 may pertain to the functionality or operation of detachable smart card 16. Information 24 ("2933 48237505") is visible in FIG. 2, but typically information such as information 24 is initially concealed, for example, by a layer of scratch-removable material.

Smart card 16 and information tab 17 are shown directly connected; that is, they are connected without an intermediate element therebetween because they have a common breakaway link 14. Alternatively, it may be said that smart card 16 and information tab 17 are adjacent. Accordingly, the first region and the second region (which are the regions left after the detachment of smart card 16 and information tab 17, respectively, from carrier card 12) are also adjacent.

In general, a smart card and an information tab are considered to be directly connected (or adjacent) if the information tab is detachably connected by a breakaway link to a part of the perimeter of the involved smart card. In FIG. 2, information tab 17 is detachably connected to a part of the perimeter of smart card 16 by breakaway link 14. Breakaway link 14 is shown as a perforation line. However, breakaway link 14 may be implemented in different ways, for example, as a notch, groove, breaking bridges, or any combination thereof. Breakaway link 14 may also be obtained by mechanically weakening the zone connecting smart card 16 and information tab 17.

In accordance with the present invention a smart card and an information tab can be indirectly connected; that is, a smart card and an information tab can be connected through an intermediate element, which usually is part of the carrier card, as described in connection with FIG. 3A discussed below.

Information tab 17 and smart card 16 may remain interconnected as a consolidated payload set 20 after they are detached from carrier card 12. Information tab 17 and smart card 16 may later be detached from one another along breakaway link 14. If the detachment of payload set 20 from carrier card 12 occurs prior to distribution, carrier card 12 becomes available for recycling at the factory, without requiring participation by the end users.

In some embodiments, carrier card 12, smart card 16 and information tab 17 are made from or include some of the same raw materials. In other embodiments smart card 16 and information tab 17 are made from or include the same raw materials, which differ from the raw materials of carrier card 12. In other embodiments, carrier card 12, detachable smart card 16 and detachable information tab 17 are made from or include different raw materials.

Figure 3A:
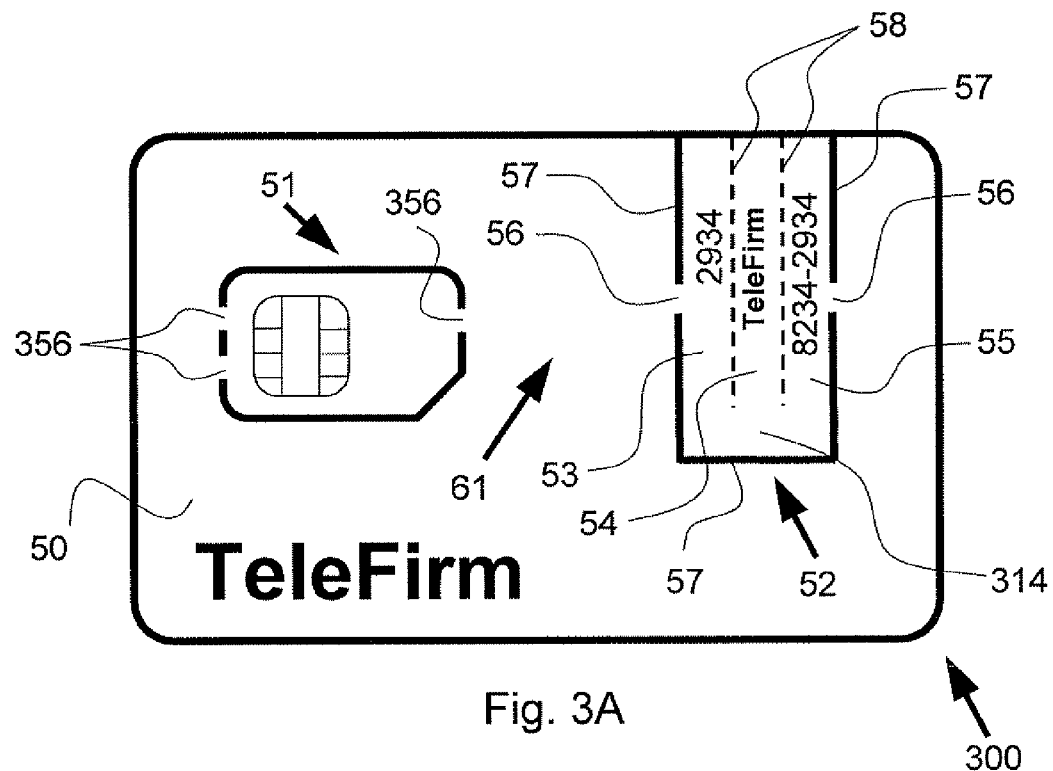
FIG. 3A depicts a ternary SIM card according to another embodiment of the present invention.

FIG. 3A depicts an alternate embodiment ternary card assembly 300 in which a smart card (a payload) and an information tab (which constitutes with the payload a payload set) are detachably connected through an intermediate element. Information tab 52 and smart card 51 are carried by carrier card 50, which may comply with the ID-1 format. Smart card 51, which may comply with the ID-000 format, and information tab 52 are detachably connected indirectly, that is, through an intermediate element, which is generally shown at 61, that is part of carrier card 50. The term "intermediate element" generally references a portion of carrier card 50 that separates a smart card and an information tab associated with the same payload set. It may likewise be said that information tab 52 and smart card 51 are located remotely, or that information tab 52 and smart card 51 do not have any boundary segment in common, or that information tab 52 and smart card 51 are not adjacent, or that information tab 52 is not detachably (nor otherwise) connected to any part of the perimeter of smart card 51. It may likewise be said that the payload set of FIG. 3A, which includes smart card 51 and information tab 52, is an unconsolidated payload set, whereas the payload set of FIG. 2, which includes smart card 16 and information tab 17, is a consolidated payload set.

Information tab 52 is detachably connected to (that is, separable from) carrier card 50 along breakaway link 57, which includes breaking bridges 56 and an empty space in between breaking bridges 56. Breakaway link 57 may include additional or alternative breaking bridges similar to breaking bridges 56. Breaking bridges may be spaced equidistantly along breakaway link 57.

In this embodiment, information tab 52 includes one or more panels that are elastically displaceable from the plane of the information tab. Panels, which are elastically displaceable from the plane of an information tab, may be created using inner breakaway links such as exemplary inner breakaway links 58. Breakaway links 58 may be perforations, grooves, notches, and so on, or as described herein in connection with any other breakaway link.

Information tab 52 includes a left panel 53, a middle panel 54 and a right panel 55, which are laterally arranged in the plane of information tab 52, and these panels initially coincide with the plane of carrier card 50. The phrase "initially coincides with the general plane of carrier card 50" describes the geometrical plane of information tab 52 before information tab 52 is detached from carrier card 50. After the detachment, however, each of panels 53, 54 and 55 may rest in the information tab's general plane if the panel is not diverted otherwise. As explained below, when an information tab is used, for example, as a paper clip, at least one panel may be elastically displaced from the general plane of the information tab.

Each adjacent pair of panels may be detachably connected by an inner breakaway link. By way of example, left panel 53 and middle panel 54 are directly connected by the left side inner breakaway link 58. Likewise, middle panel 54 and right panel 55 are directly connected by the right side inner breaking link 58.

After detachment of information tab 52 from carrier card 50 and separation of panels 53, 54 and 55 along the inner breakaway links, panels 53 through 55 form three "legs" that can each be independently and elastically displaced with respect of the general plane of information tab 52. Such displacement may be useful for clipping several sheets of paper together, as exemplified in FIG. 3B.

Although exemplary information tab 52 is shown having three elastically displaceable rectangular panels, an information tab may have a different number of elastically displaceable panels, and the panels may have different shapes and sizes. Exemplary inner tearing lines 58 are shown parallel to one another. However, an inner tearing line may slant relative to another inner tearing line or to a side of breakaway link 57. An information tab may include more than two inner breaking lines, and different inner tearing lines may have different directional orientations. Inner breaking lines may be straight lines, curved lines, and so on. An information tab may include pointed edges, rounded edges, and so on.

Left panel 53, middle panel 54 and right panel 55 share a common back portion shown at 314, which connects the proximal end of each of panels 53 to 55 together. The distal ends of left panel 53, middle panel 54 and right panel 55 may be pointed, rounded, rectangular, triangular, and so on. By way of example, left panel 53, middle panel 54 and right panel 55 are shown in FIG. 3A having distal ends that are rectangular.

Elastically displaceable panels allow a user to exploit information tab 52 in applications having peripheral relations to the smart card. For example, information tab 52 may be used as a paper clip for papers relating to the mobile telephone service contract. Using information tab 52 as a paper clip reduces the chances of losing the information it carries.

Breaking bridges 356 secure smart card 51 in a space within carrier card 50 of the card assembly, and a first region in carrier card 50 corresponding to this space may be obtained by detaching smart card 51 from carrier card 50. Likewise, breaking bridges 56 secure information tab 52 in a space within carrier card 50, and a second region in carrier card 50 corresponding to this space may be obtained by detaching smart card 51 from carrier card 50. The first region may be a recess or a hole, and the second region may be a hole. For embodiments where the first region is a recess, the carrier card may be fabricated with this recess to accommodate the smart card inserted afterward.

Smart card 51 and information tab 52 are shown connected through an intermediate element that is part of carrier card 50. In other words, smart card 51 and information tab 52 are not adjacent. Accordingly, the first region and the second region are also not adjacent.

In general, a smart card and an information tab are considered to be not adjacent if the information tab is not directly connected to any part of the perimeter of the smart card. As an example, FIG. 3A shows that information tab 52 is not directly connected to any part of the perimeter of smart card 51.

Figure 3B:
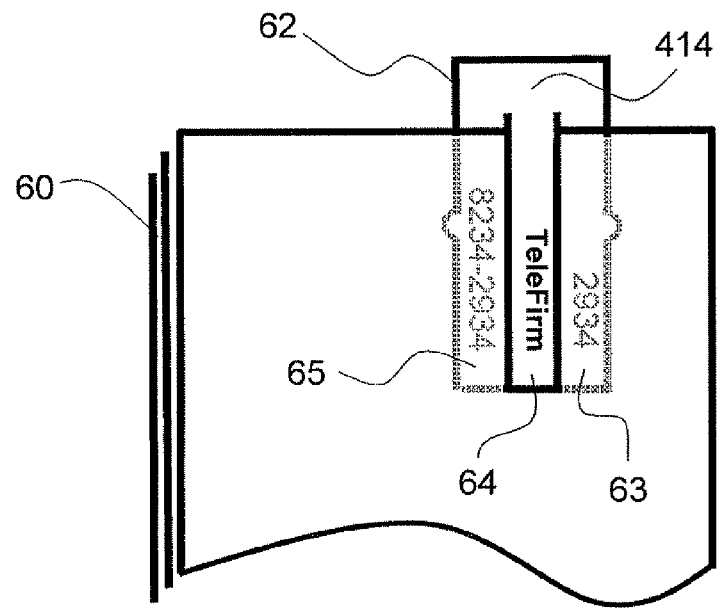
FIG. 3B illustrates an exemplary usage of the information tab depicted in FIG. 3A.

FIG. 3B depicts an exemplary information tab 62 (resembling information tab 52 of FIG. 3A) in use as a paper clip. Paper sheets 60 are shown clipped together by information tab 62. These sheets may be a copy of a contract provided to a phone subscriber. Being hidden underneath paper sheets 60, the exemplary information "2934" and "8234-2934" and panels 63 and 65, respectively, on which they are printed, are shown using faint lines. Middle panel 64 carries additional exemplary information ("TeleFirm"). Information tab 62 may have the same colors as the carrier card from which it was detached, or it may have different colors. Right panel 63, middle panel 64 and left panel 65 share a common back portion 414, which functions like back portion 314 in FIG. 3A.

Figure 4:
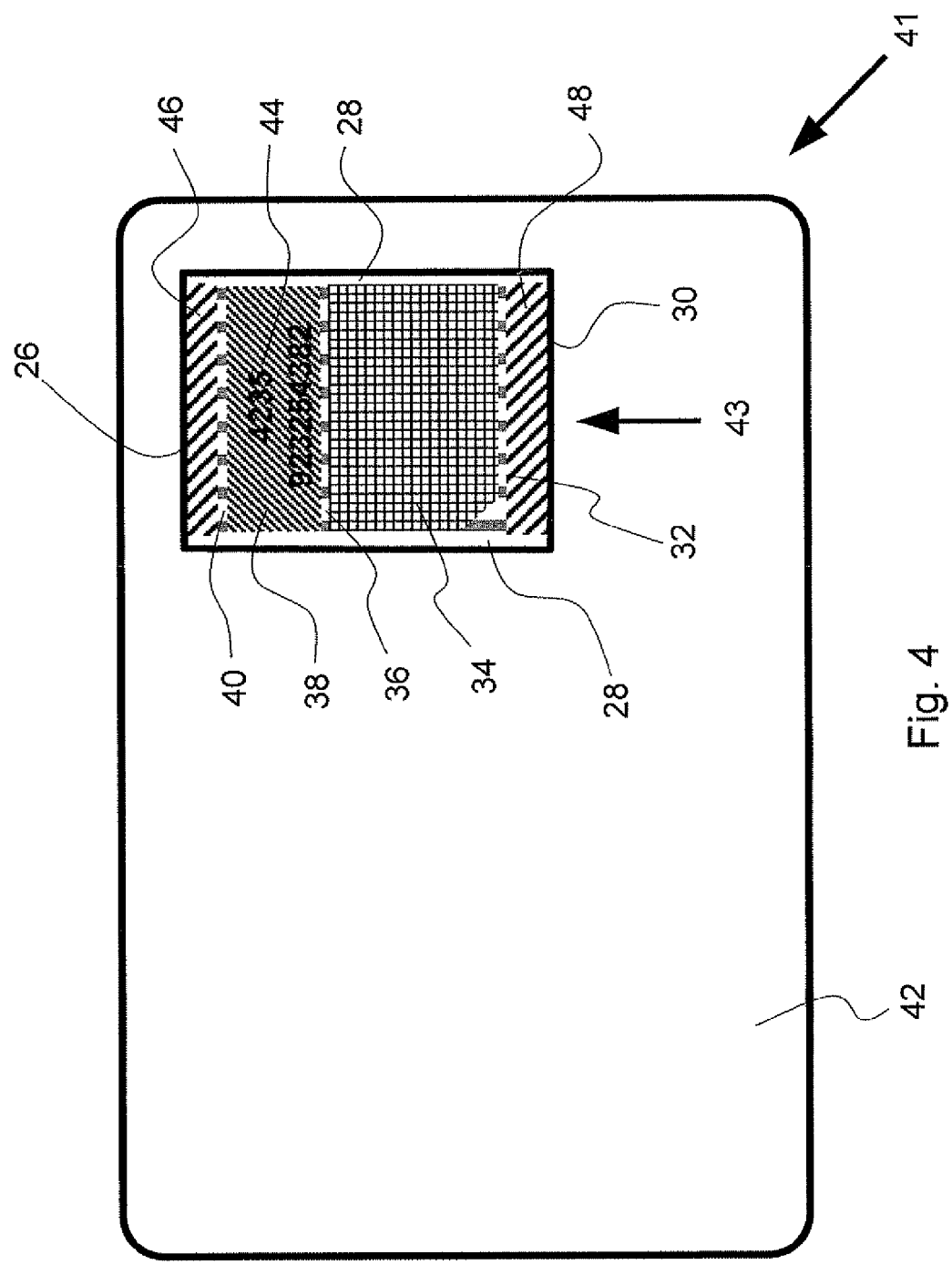
FIG. 4 depicts a ternary card assembly according to yet another embodiment of the present invention.

FIG. 4 depicts a ternary card assembly according to another embodiment of the present invention. A ternary card assembly 41 includes a detachable smart card 34, the electrical contacts of which are not shown, and a detachable information tab 38. Information tab 38 has information 44, "4235" and "923254382," thereon. Information 44 may be printed or engraved on the information tab. Information 44 is also unique to smart card 34 and pertains to the card's functionality or operation.

Smart card 34 and information tab 38 form a consolidated payload set 43 that is carried by carrier card 42. Carrier card 42, which may comply with the ID-1 format, includes an opening 28 for accommodating, supporting, or retaining payload set 43. Smart card 34 and information tab 38 may be fabricated as a single fully molded unit or package. Molding smart card 34 and information tab 38 as one unit reduces the chance that the ternary card will reach the end-user or consumer with the wrong information tab associated with the smart card. Smart card 34 and information tab 38 are directly connected (by breakaway link 36), which makes them a consolidated payload set.

Smart card 34 and information tab 38 may be connected to carrier card 42 using adhesive. Payload set 43 includes two adherent strips or glued bars 46 and 48 for adhering payload set 43 to respective seats 26 and 30 in carrier card 42. The term "seat" refers to one or more edges in carrier card 42 configured to retain the payload set 43 in place. Glued bar 46 may be connected to information tab 38 by breakaway link 40, and glued bar 48 may be connected to smart card 34 by breakaway link 32.

If adherent strips/glued bars 46 and 48 are implemented to be sufficiently strong, separation from seats 26 and 30, respectively, in carrier card 42 will be inhibited. Payload set 43 is thus detached from carrier card 42 at breakaway links 32 and 40. If, instead, adherent strips/glued bars 46 and 48 are implemented not as strongly, detachment of payload set 43 from carrier card 42 may result from applying relatively little force, thus rendering breakaway links 32 and 40 unnecessary.

After delivery of ternary card assembly 41 to a customer, the customer may detach payload set 43 from carrier card 42. At that time, carrier card 42 is available for recycling.

Once detached from carrier card 42, information tab 38 and smart card 34 may be detached from one another by tearing along breakaway link 36. Then, information tab 38 with information 44 may be kept in a safe place to preserve the confidentiality of information 44. Smart card 34 may be inserted into the intended host device, for example, a mobile telephone, and carrier card 42 is then available for recycling.

A smart card may be molded without an integrated information tab as in payload set 43. In such a case, customized or unique information is added onto the information tab after molding, and then the information tab is detached by the end user as described in connection with FIG. 2 or FIG. 3A.

Glued bars 46 and 48 secure payload set 43 in a space within carrier card 42, and a single region (in the body of carrier card 42) corresponding to this space is obtained by detaching payload set 43 from carrier card 42. The single region is the combination of a first region, which corresponds to the space formerly occupied by smart card 34, and a second region, which corresponds to the space formerly occupied by information tab 38. The first region and the second region may be a hole in the body of carrier card 42.

Figure 5:
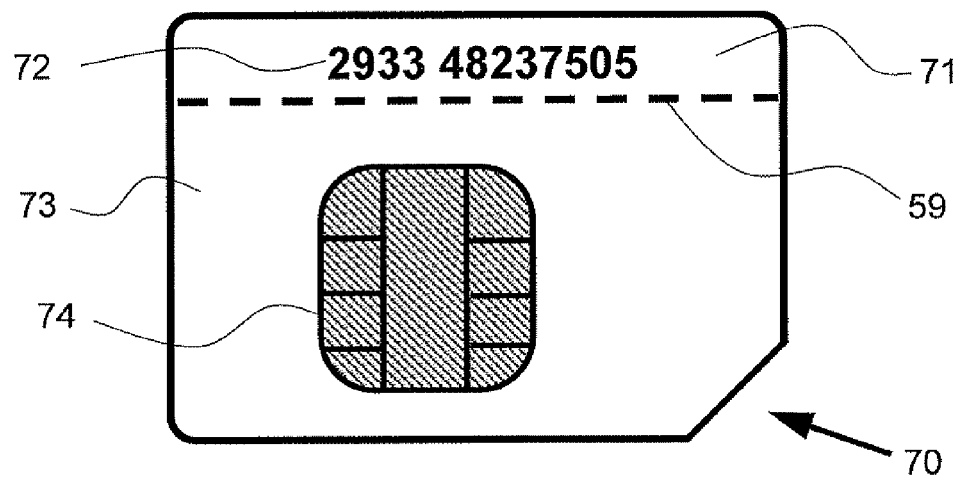
FIG. 5 depicts an exemplary payload set according to an embodiment of the present invention.

FIG. 5 depicts a payload set 70 according to another embodiment of the present invention. Payload set 70 includes a smart card 73 and an information tab 71 detachably connected.

Figure 1:
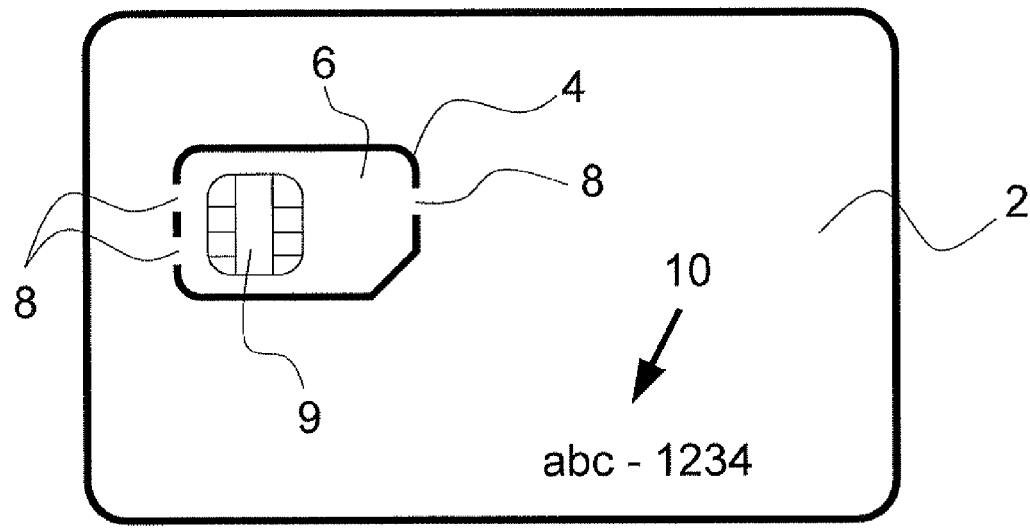
FIG. 1 depicts a prior art assembly of an ID-000 card located within a ID-1 card.

In contrast to two-part card assemblies, such as the prior art shown in FIG. 1, where the entire perimeter of the smart card is detachably connected to the information-carrying media (the carrier card), in the present invention only a part of the perimeter of the smart card is connected to the information-carrying media (information tab). In other words, some prior art carrier cards are themselves the information-carrying media, whereas according to the present invention the information-carrying media is detachable from the carrier card.

Smart card 73 and information tab 71 may be made from the same raw material, which is often molded plastic. Smart card 73 and information tab 71 are connected by breakaway link 59 such that information tab 71 can be torn from smart card 73 by bending payload set 70 along breakaway link 59. Breakaway link 59 may be a slot, groove, perforations, bridge, and so on.

Smart card 73 is shown having electrical contacts 74 leading to an embedded electronic circuitry. If smart card 73 is embodied as a SIM card, the embedded electronic circuitry is a SIM module.

Information tab 71 is has exemplary information "2933 48237505" shown at 72 that may be unique to smart card 73. Exemplary information 72 may pertain to the functionality or operation of smart card 73. Exemplary information 72 may include, for example a PIN code and/or a PUK key (and/or other kinds of information or data) that are customized to, or associated with, the memory content, functionality or operation of smart card 73. Information 72 may be printed or engraved on information tab 71 and thereafter concealed with scratch-removable material. Before using smart card 73 (the payload), the end user may divide payload set 70 at breakaway link 59 to detach information tab 71 from smart card 73, insert smart card 73 into the intended device (a cellular phone, for example), and keep information tab 71 in a safe place to maintain the secrecy of information 72.

Figure 6:
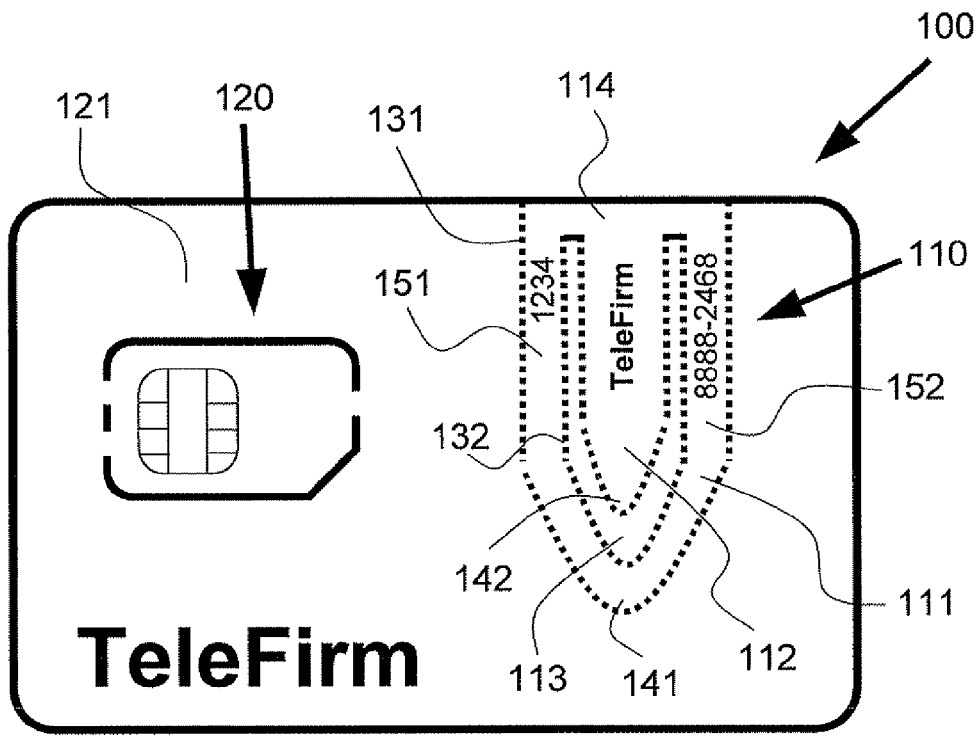
FIG. 6 depicts a ternary SIM card according to still another embodiment of the present invention.

FIG. 6 depicts a ternary card assembly according to yet another embodiment of the present invention. Ternary card assembly 100 includes an information tab 110, which is part of a payload set that includes payload 120. Ternary card assembly 100 also includes a carrier card 121 for carrying smart card 120 and information tab 110.

In this embodiment, an information tab may include one or more panels configured as a "panel-within-panel" that are elastically displaceable from the plane of the information tab. Such panels may be created by using inner breakaway links 58 as shown in FIG. 3A. Information tab 110 includes an outer, or peripheral, panel 111 and an inner, or central, panel 112. Peripheral panel 111 and central panel 112, which are configured as a panel-within-panel, lie in the plane of ternary card assembly 100. The outer and inner panels of an information tab may be formed adjacent to each other. That is, the outer panel and the inner panel of an information tab may be directly connected by only common inner breakaway link(s) that may be similar to inner breakaway links 58 of FIG. 3A.

The outer and inner panels of an information tab may instead be spaced apart. That is, the panels may be separated by a spacer. The term "spacer" references a discernible region that may or may not be occupied by material such as plastic or may be partly occupied by material. In the present example, peripheral panel 111 and central panel 112 are spaced apart by disposable spacer 113. Disposable spacer 113 is shown in FIG. 6 confined within closed breakaway link 132 (shown as a dotted line). Disposable spacer 113, peripheral panel 111 and central panel 112 may be made from, or include, the same raw material(s), which may be plastic or any other suitable elastic material.

Peripheral panel 111 and central panel 112 share a common back portion (shown at 114). Back portion 114 connects the proximal end of peripheral panel 111 to the proximal end of central panel 112. The terms "proximal" and "distal" relate to back portion 114. The distal ends of the peripheral and central panels (141 and 142, respectively) may be pointed, rounded, rectangular, triangular, or similar shape. By way of example, peripheral panel 111 and central panel 112 are shown in FIG. 6 having distal ends (141 and 142) that are pointed.

Peripheral panel 111 includes a left hand side portion 151 and a right hand side portion 152. Left hand side portion 151 and right hand side portion 152 each has a proximal end that elastically connects to back portion 114. Left hand side portion 151 and right hand side portion 152 join to form the pointed distal end 141 of peripheral panel 111. Central panel 112 has a proximal end that connects to back portion 114 and distal end 142 that extends away from back portion 114, towards the pointed distal end 141 of peripheral panel 111.

Information tab 110 may be detached from carrier card 121 by separating at a breakaway link such as perforation line 131 (shown in dotted line). Once detached from carrier card 121, disposable spacer 113 may be removed from information tab 110 by tearing along breakaway link 132, which is in this example a closed line. (Disposable spacer 113 is then available for recycling.) Alternatively, disposable spacer 113 may be separated from information tab 110 prior to the detachment of information tab 110 from carrier card 121, thereby allowing ternary card assembly 100 to be clipped to a shirt pocket.

After detachment, information tab 110 may be used as a paper clip, and the user may push down on back portion 114 to steady information tab 110 (the paper clip) while peripheral panel 111, or central panel 112, or both, are elastically displaced from the information tab plane for receiving one or more sheets of paper . According to an aspect of the present invention, the spacer may be an empty space, as shown in connection with FIG. 7.

Figure 7:
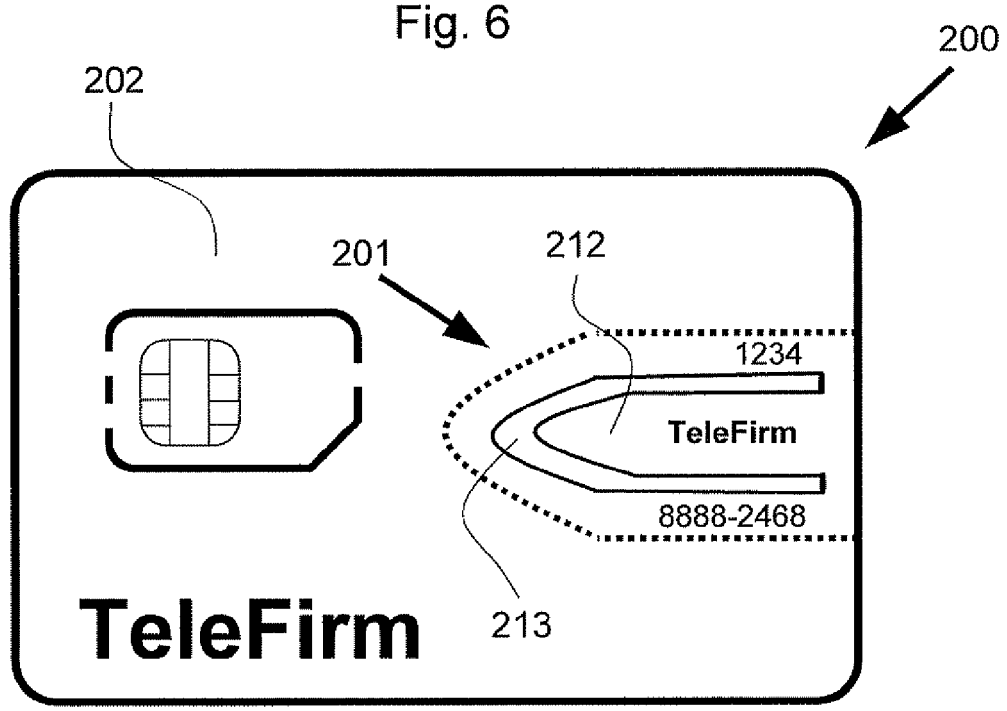
FIG. 7 depicts a ternary SIM card according to yet another embodiment of the present invention.

FIG. 7 shows a ternary card assembly 200 with an information tab 201. Although information tab 201 is similar to information tab 110 of FIG. 6, disposable spacer 113 is replaced with a gap 213. A ternary card assembly that includes an information tab such as information tab 201 may be clipped, for example, to a shirt pocket even before information tab 201 is detached from carrier card 202.

The top surface of one or more of panels 53, 54 and 55 of FIG. 3A, panels 63, 64 and 65 of FIG. 3B and panels 111 and 112 of FIG. 6, may be textured or roughened to clamp items such as paper more easily. The textured surfaces may have raised dots or other types of protrusions.

Another aspect of the invention is a method of preparing a smart card for use. Although the embodiment discussed here references FIG. 3A, the method is applicable to other embodiments, also. The method of preparing smart card 51 of FIG. 3A for use includes the steps of detaching smart card 51 from carrier card 50 and detaching information tab 52 from carrier card 50. Detaching smart card 51 from carrier card 50 and detaching information tab 52 from carrier card 50 may be executed concurrently, or smart card 51 may be detached from carrier card 50 prior to the detachment of information tab 52 from carrier card 50, or vice versa.

Another aspect of the invention is a method of customizing a smart card. Although the embodiment discussed here references FIG. 3A, the method is applicable to other embodiments, also. The method of customizing smart card 51 includes the step of providing a card assembly 300, having a carrier card 50, and a payload set detachable from carrier card 50. The payload set includes smart card 51 and information tab 52 detachably connected to smart card 51. The method also includes uploading to smart card 51 operational data. The method further includes the step of adding onto the information tab 52 information pertaining to the operational data, the information being unique to the smart card.

It is within the scope of the invention that the form factor of carrier cards such as carrier card 12 of FIG. 2, carrier card 50 of FIG. 3A, and carrier card 42 of FIG. 4 may comply with formats other than ID-1 The form factor of smart cards such as smart card 16 of FIG. 2 and smart card 51 of FIG. 3A may comply with formats other than ID-000. As exemplified in FIG. 4, the form factor of a smart card does not have to comply with a specific format or standard.

Various modifications, changes, alterations, and additions can be made in the ternary card assembly, including in the information tab, all of which are within the scope of the present invention. In particular, the size, shape, proportions, relative location and orientation of an information tab within a carrier card may differ from what has been exemplified herein.

What we claim:

1. A card assembly comprising:
   a) a carrier card;
   b) a smart card detachably connected to said carrier card; and
   c) an information tab detachably connected to said carrier card, to said smart card, or to both, said information tab includes one or more panels that are elastically displaceable from the plane of said information tab, said one or more panels are configured as a paper clip.

2. The card assembly according to claim 1, wherein said information tab has information thereon that pertains to the operation of said smart card, said information being unique to said smart card.

3. The card assembly according to claim 2, wherein at least some of said information is concealed.

4. The card assembly according to claim 2 wherein said at least some of said information is concealed by a scratch-removable cover.

5. The card assembly according to claim 1, wherein said smart card and said information tab are directly connected.

6. The card assembly according to claim 1, wherein said smart card and said information tab are detachably connected through an intermediate element that is part of said carrier card.

7. The card assembly according to claim 1, wherein said smart card and said information tab are connected using breakaway links.

8. The card assembly according to claim 7, wherein a breakaway link includes a groove.

9. The card assembly according to claim 7, wherein a breakaway link includes a perforation.

10. The card assembly according to claim 1, wherein said carrier card, said smart card, and said information tab include the same material.

11. The card assembly according to claim 1, wherein said smart card and said information tab are made from the same raw material that differs from the raw material of said carrier card.

12. The card assembly according to claim 1, wherein said smart card is a subscriber identity module card.

13. The card assembly according to claim 1, wherein said carrier card complies with the ID-1 format.

14. The card assembly according to claim 1, wherein said smart card complies with the ID-000 format.

15. The card assembly according to claim 1, wherein said smart card includes an embedded integrated circuit.

16. A payload set comprising:
   a) a smart card complying with the ID-000 format and having a perimeter; and
   b) an information tab detachably connected to only a part of said perimeter by a breakaway link, said information tab has information thereon that pertains to operation of said smart card, said information being unique to said smart card, said information is at least one of a Personal Identification Number (PIN) code that is used to authenticate to a system or a PIN unlock key (PUK) that is used to unlock said smart card.

17. The payload set according to claim 16, wherein said smart card and said information tab include the same material.

18. The payload set according to claim 16, wherein the smart card has a first side with a length of "x" units and a second side with a length of "y" units in conformance with the ID-000 format, the information tab has a first side that is detachably connected to either the first side of the smart card or to the second side of the smart card, the first side of the information tab has a length of approximately "x" units if detachably connected to the first side of the smart card, the first side of the information tab has a length of approximately "y" units if detachably connected to the second side of the smart card.

19. A card assembly comprising:
   a carrier card having outer edges;
   a smart card detachably connected to said carrier card, said smart card having an embedded integrated circuit; and
   an information tab detachably connected to said carrier card, to said smart card, or to both, said information tab has information thereon that pertains to operation of said smart card, said information being unique to said smart card, wherein said information is at least one of a Personal Identification Number (PIN) code that is used to authenticate to a system or a PIN unlock key (PUK) that is used to unlock said smart card.

20. The card assembly of claim 19, wherein said information tab is entirety within said outer edges of said carrier card.

21. The card assembly of claim 20, wherein said information tab is detachably connected to said smart card.

22. The card assembly of claim 21, wherein said information tab is detachably connected to said carrier card.

23. The card assembly of claim 19, wherein said information tab is detachably connected to said carrier card but said information tab is not detachably connected to said smart card.

24. The card assembly of claim 19, wherein said smart card complies with an ID-000 format.

25. The card assembly of claim 24, wherein said carrier card complies with an ID-1 format.

26. The card assembly according to claim 19, wherein said smart card includes an embedded integrated circuit.

27. The card assembly according to claim 19, wherein said smart card and said information tab are molded as one unit.

28. The card assembly according to claim 19, wherein said smart card and said information tab are connected to said carrier card using adhesive.

29. A card assembly comprising:
   a carrier card having outer edges forming a closed loop;
   a smart card detachably connected to said carrier card, said smart card having an embedded integrated circuit; and
   an information tab detachably connected to said carrier card, to said smart card, or to both, said information tab has information thereon that pertains to operation of said smart card, said information being unique to said smart card, wherein said information tab is entirely within said loop.

30. A method of forming a card assembly, said method comprising:
   accessing a card assembly that includes a carrier card, a smart card detachably connected to said carrier card and an information tab detachably connected to said carrier card, to said smart card, or to both said carrier card and said smart card, said smart card having an embedded integrated circuit;
   storing information in said smart card, said information includes at least one of a Personal Identification Number (PIN) code that is used to authenticate to a system or a PIN unlock key (PUK) that is used to unlock said smart card; and
   adding information to said information tab that corresponds to said information stored in said smart card, said information added to said information tab includes at least one of said Personal Identification Number (PIN) code or said PIN unlock key (PUK).

31. The method of forming a card assembly of claim 30, wherein said adding information to said information tab that corresponds to said information stored in said smart card includes concealing at least a portion of said information added to information tab that corresponds to said information stored in said smart card.

32. The method of forming a card assembly of claim 30, wherein said accessing a card assembly includes forming said card assembly.

33. The method of forming a card assembly of claim 32, wherein said forming said card assembly includes forming one or more panels that are elastically displaceable from the plane of said information tab, said one or more panels are configured as a paper clip.

34. The method of forming a card assembly of claim 32, wherein said forming said card assembly includes forming a detachable connection between said information tab and said smart card.

35. The method of forming a card assembly of claim 32, wherein said forming said card assembly includes forming a detachable connection between said information tab and said carrier card.

36. The method of forming a card assembly of claim 32, wherein said forming said card assembly includes attaching said information tab to said carrier card with an adhesive.

37. The method of forming a card assembly of claim 30, wherein said smart card is a subscriber identity module card.

38. The method of forming a card assembly of claim 30, wherein said smart card complies with an ID-000 format.

39. The method of forming a card assembly of claim 30, wherein said carrier card complies with an ID-1 format.

* * * * *